United States Patent
Van Der Vleuten

(10) Patent No.: US 9,071,824 B2
(45) Date of Patent: Jun. 30, 2015

(54) SCALABLE IMAGE CODING AND DECODING

(71) Applicant: KONINKLIJKE PHILIPS N.V., Eindhoven (NL)

(72) Inventor: Renatus Josephus Van Der Vleuten, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/276,475

(22) Filed: May 13, 2014

(65) Prior Publication Data

US 2014/0248000 A1 Sep. 4, 2014

Related U.S. Application Data

(62) Division of application No. 13/390,185, filed as application No. PCT/IB2010/053780 on Aug. 23, 2010, now Pat. No. 8,755,615.

(30) Foreign Application Priority Data

Sep. 4, 2009 (EP) .................................. 09169527

(51) Int. Cl.
*G06K 9/46* (2006.01)
*H04N 19/625* (2014.01)
(Continued)

(52) U.S. Cl.
CPC ....... *H04N 19/00812* (2013.01); *H04N 19/176* (2014.11); *H04N 19/70* (2014.11);
(Continued)

(58) Field of Classification Search
CPC ... H04N 19/103; H04N 19/13; H04N 19/134; H04N 19/132; H04N 19/176; H04N 19/174; H04N 19/34; H04N 19/46; H04N 19/60; H04N 19/00412; H04N 19/00442; H04N 19/00812; G06F 17/147; H03M 7/4018
USPC .......................... 382/232, 233, 240, 250, 251; 375/240.02, 240.03, 240.12, 240.18
See application file for complete search history.

(56) References Cited

U.S. PATENT DOCUMENTS 6,462,681 B1 10/2002 Van Der Vleuten
2003/0113026 A1 6/2003 Srinivasan et al.
(Continued)

FOREIGN PATENT DOCUMENTS

EP 1152595 A1 11/2001
JP H09247466 A 9/1997
(Continued)

OTHER PUBLICATIONS

Weiping Li: "Overview of Fine Granularity Scalability in MPEG-4 Video Standard"; IEEE Transactions on Circuits and Systems for Video Technology, vol. 11. No. 3, Mar. 2001, pp. 301-317.
(Continued)

*Primary Examiner* — Ali Bayat

(57) ABSTRACT

A method and device for encoding an image into a scalable bitstream, the method including acts of dividing the Image in image blocks; encoding each image block in accordance with one of a plurality of different encoding modes, to obtain corresponding block bitstreams comprising one or more types of data representative of said encoding mode; and forming the scalable bitstream by iteratively scanning the block bitstreams, each scan including acts of: selecting at least one of said types of data, including in the scalable bitstream data of the selected types from the block bitstreams, and including in the scalable bitstream flags indicating the selected types of data.

21 Claims, 3 Drawing Sheets

(51) Int. Cl.

| | |
|---|---|
| *H04N 19/176* | (2014.01) |
| *H04N 19/70* | (2014.01) |
| *H04N 19/122* | (2014.01) |
| *H04N 19/60* | (2014.01) |
| *H04N 19/12* | (2014.01) |
| *H04N 19/136* | (2014.01) |
| *H04N 19/17* | (2014.01) |
| *H04N 19/27* | (2014.01) |
| *H04N 19/34* | (2014.01) |

(52) U.S. Cl.
CPC ............ *H04N 19/122* (2014.11); *H04N 19/60* (2014.11); *H04N 19/12* (2014.11); *H04N 19/136* (2014.11); *H04N 19/17* (2014.11); *H04N 19/27* (2014.11); *H04N 19/34* (2014.11); *H04N 19/625* (2014.11)

(56) References Cited

U.S. PATENT DOCUMENTS

| | | |
|---|---|---|
| 2003/0169928 A1 | 9/2003 | Stanek |
| 2003/0169932 A1 | 9/2003 | Li et al. |
| 2004/0017939 A1 | 1/2004 | Mehrotra |
| 2011/0064133 A1* | 3/2011 | Park et al. .................. 375/240.2 |
| 2011/0064325 A1* | 3/2011 | Park et al. .................... 382/250 |
| 2011/0090967 A1 | 4/2011 | Chen |
| 2012/0155780 A1* | 6/2012 | Van Der Vleuten .......... 382/233 |

FOREIGN PATENT DOCUMENTS

| | | |
|---|---|---|
| JP | 2004504782 A | 2/2004 |
| JP | 200513883 A | 5/2005 |
| JP | 2003143413 A | 5/2006 |
| JP | 2007020010 A | 1/2007 |
| JP | 2007235758 A | 9/2007 |
| WO | 9828909 A1 | 7/1998 |
| WO | 2005112467 A1 | 11/2005 |

OTHER PUBLICATIONS

Touradj Ebrahimi et al: "MPEG-4 Natural Video Coding-An Overview", Elsevier Science Publishers, Amsterdam NL. Signal Processing: Image Communication, vol. 15, No. 4/5, Jan. 1, 2000, pp. 365-385.

Athanassios Skodras et al: "The JPEG 2000 Still Image Compression Standard"; IEEE Signal Processing Magazine, IEEE Service Center, Piscataway, NJ, vol. 18, No. 5, Sep. 1, 2001, pp. 36-58.

Thomas Wiegand et al: "Overview of the H.264/AVC Video Coding Standard", IEEE Transactions on Circuits and Systems for Video Technology, IEEE Service Center, Piscataway, NJ, vol. 13, No. 7, Jul. 1, 2003, pp. 560-576.

Lambert et al: "Flexible Macroblock Ordering in H.264/AVC", Journal of Visual Communication and Image Representation, Academic Press, Inc., vol. 17. No. 2, Apr. 1, 2006, pp. 358-375.

* cited by examiner

SCALABLE IMAGE CODING AND DECODING

CROSS-REFERENCE TO RELATED APPLICATIONS

This application is a divisional of prior U.S. patent application Ser. No. 13/390,185, filed Feb. 13, 2012, which is a national application of PCT Application No. PCT/IB10/053780, filed Aug. 23, 2010 and claims the benefit of European Patent Application No. 09169527.0, filed Sep. 4, 2009, the entire contents of each of which are incorporated herein by reference thereto.

FIELD OF THE INVENTION

The invention relates to a method and device for encoding images into a scalable bitstream. The invention also relates to a corresponding method and device for decoding such a scalable bitstream, an encoded image signal in the form of such a (possibly truncated) scalable bitstream, and a storage medium having recorded thereon such an encoded image signal. The invention is particularly useful for encoding the video images of a high definition television (HDTV) signal.

BACKGROUND OF THE INVENTION

Scalable video coding to envisaged for wireless transmission of High Definition television signals (WirelessHD), in particular for the purpose of invisibly connecting a wall-mounted HDTV flat screen monitor to an external HDTV signal source. Scalable means that a bitstream produced by the encoder can be truncated.

A prior art method of obtaining a scalable bitstream is disclosed in U.S. Pat. No. 6,462,681. The prior art comprises dividing each image in image blocks, transform encoding each image block in corresponding block bitstreams, and forming the scalable bitstream by iteratively scanning the blockstreams, including in each scan a part of the data in the block bitstreams.

In experimental evaluations in the context of WirelessHD, the inventors found that an improvement of the compression performance was desired for certain computer-graphics content. For WirelessHD, both natural image content and graphics content should be supported, The for art method is designed for natural image content and is not specifically optimized for graphics content.

OBJECT AND SUMMARY OF THE INVENTION

It is an object of the invention to further improve the prior art method.

To this end, the encoding method in accordance with the invention comprises the step of encoding each image block in accordance with one of a plurality of different encoding modes, to obtain corresponding block bitstreams comprising one or more types of data representative of said encoding mode. While forming the scalable bitstream by iteratively scanning the blockstreams, each scan comprising the steps of selecting at least one of said types of data, and including flags in the scalable bitstream to indicate the selected types of data.

The invention provides a scalable bitstream format that allows a very flexible combination of the various block bitstreams, which enables an optimized bit-allocation. The multiple encoding modes have different importance priorities as regards the picture quality of the decoded image data. The invention allows the scalable video bitstream to be organized such that the largest quality improvements are achieved first, followed by successively smaller quality refinements when more of the bitstream is received. In this way, an optimal rate-distortion trade-off is achieved. Because of the different importance of the modes for the objective/subjective quality, the bitstream format enables the encoder to very flexibly choose which bits to send first.

Similar to known video coding methods, the video images are preferably divided in slices, and each slice is divided in blocks of 8×8 pixels. The 8×8 pixel blocks are intraframe coded, which means that no information from other frames is used.

Each block is encoded in accordance with one of three encoding modes:
  In a natural mode, the block is considered to represent a part of a natural image. In that case, it is DCT transformed and converted into a scalable block bitstream. Preferably, scalable bit plane coding is used as disclosed in, for example, WO 2005/112467.
  In a synthetic mode, or scalable graphics mode, the block is found to contain graphics contents that can more efficiently be coded as a specific graphic scalable block bitstream.
  In a skip mode, a block is represented by a 1 bit flag indicating that it was found to be identical to the previous block.

The bitstream format in accordance with the invention consists of a multitude of scans/iterations through the scalable bitstream of the individual blocks. In each scan, the encoder decides whether it includes bits in the bitstream for the natural/DCT blocks, or for the synthetic/graphics blocks, or both. For the DCT blocks, it can further choose between DC coefficient bits and AC coefficient bits. For example, the encoder can choose to first send a few scans of DCT DC bits, then send a few scans of graphics bits and then send some DCT AC bits. The scans can be a mix of different mode bits or subsequent scans of single-mode bits. The decisions that the encoder makes are signaled to the receiver in the form of flags that precede each block part (e.g. encoded bit plane) and/or plurality of blocks (e.g. a slice).

In an embodiment of the invention, the bitstream format allows the block scan order to change for each scan. For example, a different scan order can be used for DCT blocks or graphics blocks. Typically, for natural images it is advantageous to first scan/allocate bits to the blocks in the center of the image.

In a further embodiment, the format allows to indicate per block whether bits are sent or not. This allows very detailed bit allocation (enabling e.g. emphasizing the quality of a region of interest).

The encoder may further have the choice per scan on whether or not to use arithmetic coding for more efficient compression of certain DCT-AC coefficient data.

The method may farther comprise the step of dividing each image in image slices and include in each slice flags indicating the encoding modes applied to said slice. Indicating, the modes that occur during compression of an image slice (8 image lines) in the beginning of the bitstream optimizes (i.e. minimizes the bits required for) the encoding of the block mode types.

DESCRIPTION OF PREFERRED EMBODIMENTS

Figure 1:
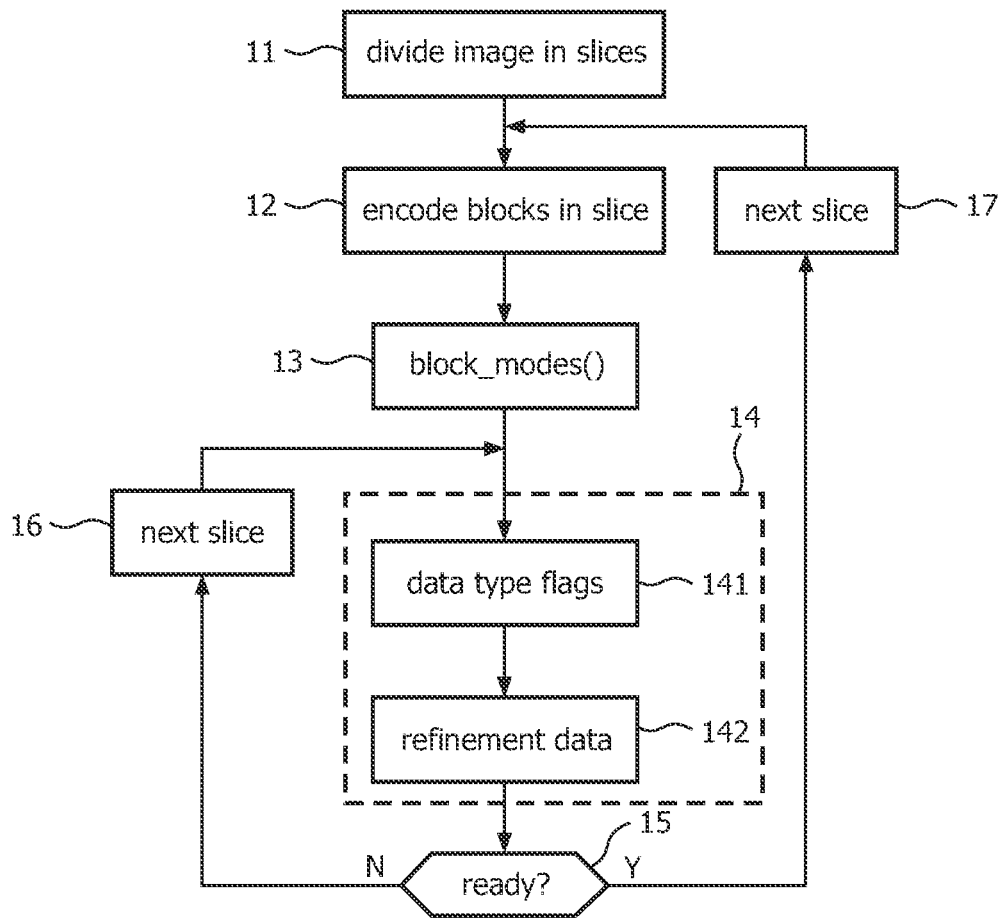
FIG. 1 shows a flow diagram illustrating the method of encoding a video signal in accordance with the invention.

FIG. 1 shows a flow diagram illustrating the method of encoding a video signal in accordance with the invention. In a step 11, a video image is divided in 8-lines high slices, and each slice is divided into blocks of 8×8 pixels.

In a step 12, each block of the current slice is encoded by either a discrete cosine transform (DCT) or a graphic compression method, depending on whether the block is found to contain natural contents or graphic contents. A skip more may also be defined, indicating that the block is identical to the previous one. The block encoding algorithms are chosen such that they yield scalable block bit streams. Such a scalable bitstream may be truncated at any position. The less is truncated, the smaller the residual error when the block is reconstructed.

Figure 2:
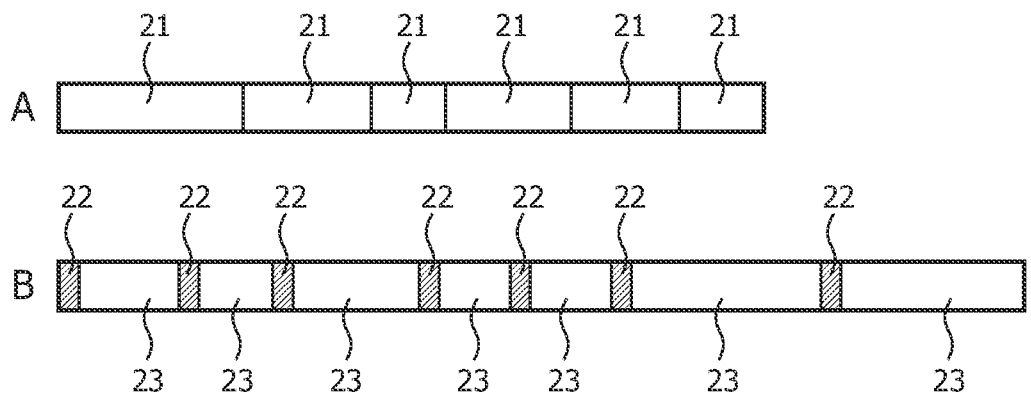
FIG. 2 diagrammatically shows scalable block bitstreams obtained in a graphic encoding mode and a DCT encoding mode.

FIG. 2 diagrammatically shows under A a scalable block bitstream obtained in the graphic encoding mode. In this mode, a graphic encoder applies a possibly lossless compression algorithm to each individual 8×8 bit plane of an image block. The block bitstream thus obtained comprises a series of eight (the pixel bitdepth) variable-length parts 21 of graphic data, each representing a bit plane of pixel values, in decreasing order of significance.

FIG. 2 diagrammatically shows under B a scalable block bit stream obtained in the natural encoding mode. In this mode, the. 8×8 pixel block is subjected to a Discrete Cosine Transform (DCT), and then converted into a sealable block bitstream by individually compressing each bit plane of the coefficients as disclosed in Applicants international Patent Application WO 2005/112467. The block bit stream now comprises eleven (the coefficient bitdepth) bit planes of coefficient values, in decreasing order of significance. As shown in FIG. 2, each bit plane comprises a dc-bit 22 and a variable-length part 23 of ac data.

Returning now to FIG. 1, a routine, is carried out in winch a video bitstream representing the current slice is formed. First, in is step 13, an array block_modes( ) is generated to identify, for each block in the slice, which block encoding mode has been used to encode it. The routine then proceeds by iteratively scanning (step 14) the block bitstreams that were generated in step 12. In each scan 14, the encoding process selects a part of the graphic block bitstreams and/or the natural block bitstreams. With respect to the natural block bitstream, the process selects the dc-bit and/or the ac data part of the respective coefficient bit plane. Each selectable part of a block bits ream represents a given refinement of the image quality. The selections are such that successively smaller refinements are added to the video bitstream as the scanning process proceeds.

In each scan 14, flags indicating which types of encoded data (graphics, dc-bit, ac-data) were selected, and thus identifting the respective encoding modes, are added to the bitstream (step 141) prior to the actual refinement data parts (step 142). The selections made by the encoder are thus signaled to the receiver. The scanning process proceeds until all the block bitstreams of the slice have been completely processed (steps 15, 16). The above process is then carried out for the next slice (step 17).

Figure 3:
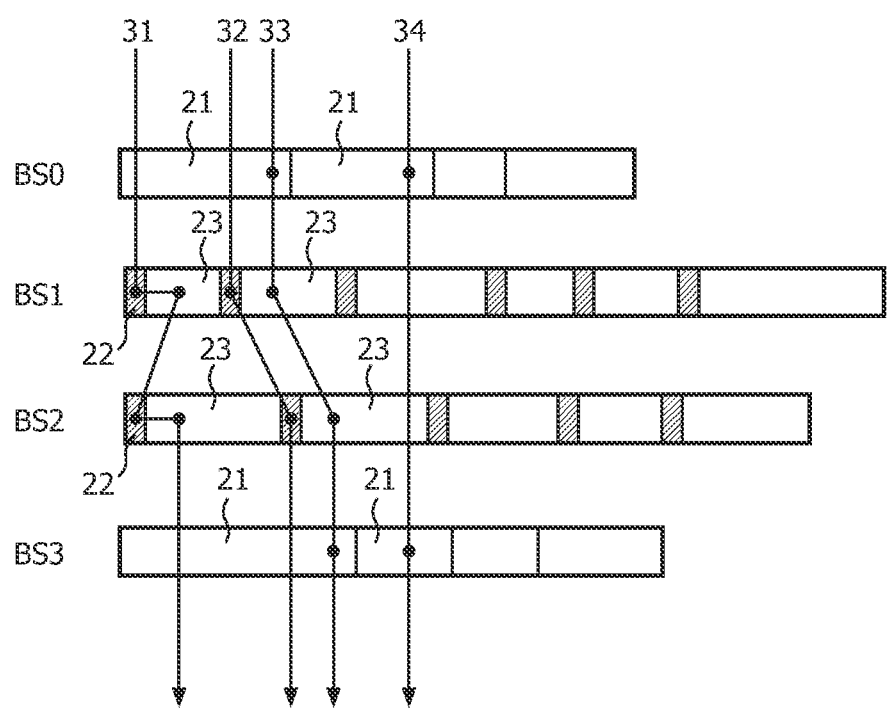
FIG. 3 shows an example illustrating the scanning process in accordance with the invention.

FIG. 3 shows an example illustrating the scanning process in accordance with the invention. The figure shows four block bit streams BS0 . . . BS3 of the first four image blocks (B0 . . . B3) of a slice. The first and fourth blocks were found to be graphic blocks. The corresponding block bitstreams BS0 and BS3 have eight graphic encoded bit planes 21 in decreasing order of significance, some of which are shown in FIG. 3. The second and third blocks are natural blocks. The corresponding block bitstreams BS1 and BS2 have eleven dc-bits 22 and eleven encoded an bit planes 23, some of which are shown in FIG. 3.

As defined by bold dots along an arrow 31, the first scan through the block streams conveys the most significant it plane of the DCT coefficients of the natural blocks (B1, B2), that is, the respective bits of the DC coefficient as well as the AC coefficients. The second scan 32 defines the next (i.e. second) bit of the DC coefficient of the natural blocks. The third scan 33 provides graphic data as well as AC coefficient data of natural blocks, that is, the first graphic bit planes of the graphic blocks (B0,B3) and the next (i.e. second) AC coefficient bit planes of the natural blocks (B1,B2). In the fourth scan 34, the second graphic bit planes are conveyed, etc.

The following Table I shows the resulting video bitstream for the slice. The flags indicating in each scan the data types that follow are denoted dct_dc_data, dct_ac_data, and graph_data. The right column shows the actual bitstream data, where "1" and "0" denote flag values, "b" represents one data bit, and "d" denotes a (possibly variable) number of data bits.

TABLE I

| | |
|---|---|
| block modes( ) | d |
| dct_dc_data | 1 |
| dct_ac_data | 1 |
| graph_data | 0 |
| BS1 $1^{st}$ dc bit | b |
| BS1 $1^{st}$ ac bit plane | d |
| BS2 $1^{st}$ dc bit | b |
| BS2 $1^{st}$ ac bit plane | d |
| end_of_stream | 0 |
| dct_dc_data | 1 |
| dct_ac_data | 0 |
| graph_data | 0 |
| BS1 $2^{nd}$ dc bit | b |
| BS2 $2^{nd}$ dc bit | b |
| end_of_stream | 0 |
| dct_dc_data | 0 |
| dct_ac_data | 1 |
| graph_data | 1 |
| BS0 $1^{st}$ bit plane | d |
| BS1 $2^{nd}$ ac bit plane | d |
| BS2 $2^{nd}$ ac bit plane | d |
| BS3 $1^{st}$ bit plane | d |
| end_of_stream | 0 |
| dct_dc_data | 0 |
| dct_ac_data | 0 |
| graph_data | 1 |
| BS0 $2^{nd}$ bit plane | d |
| BS3 $2^{nd}$ bit plane | d |
| end_of_stream | 0 |
| ... | |
| end_of_stream | 1 |

Figure 4:
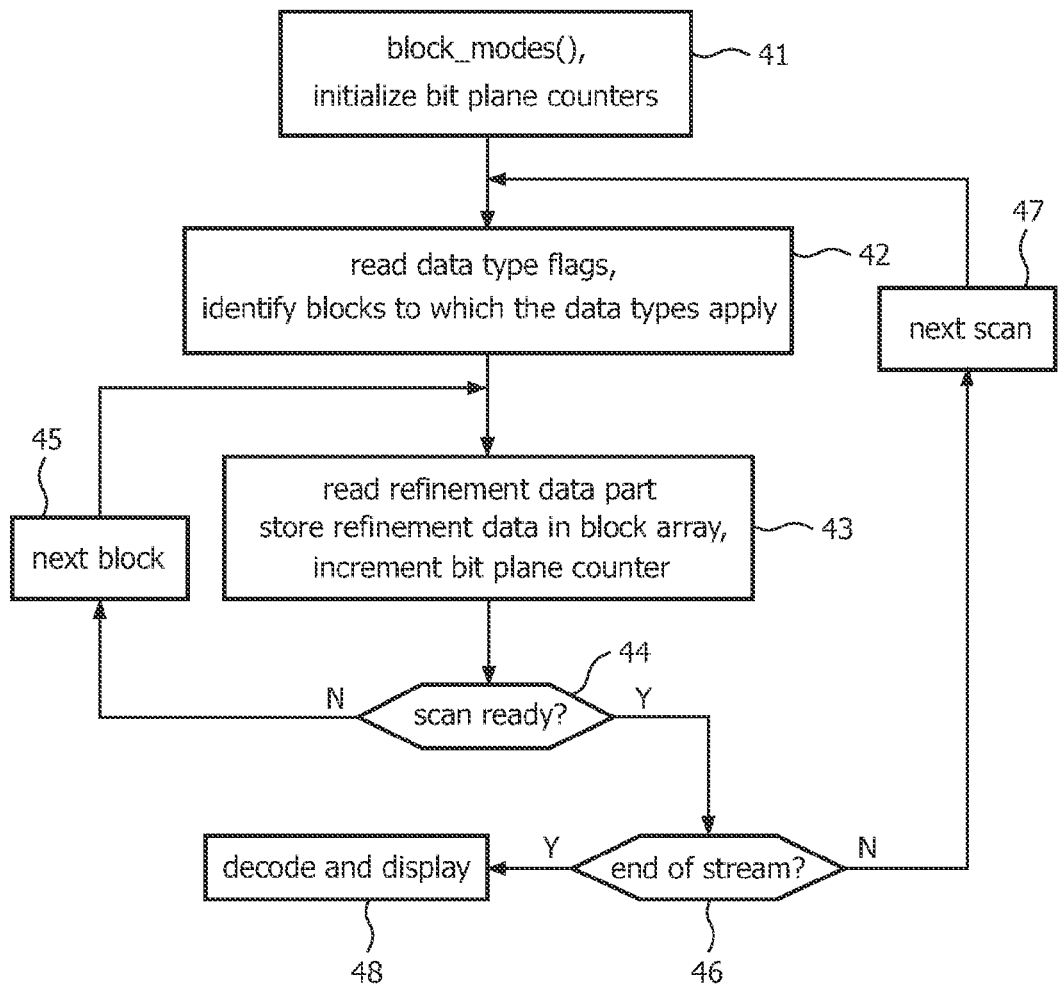
FIG. 4 shows a flow diagram illustrating the method of decoding a video bitstream signal in accordance with the invention.

FIG. 4 shows a flow diagram illustrating the method of decoding the (possibly truncated) video bitstream signal and reconstruct the image slice. Step 41 is an initialization step in which:

The block encoding modes are read and stored. For example, with respect to the bitstream shown in Table I, the receiver now knows that blocks B0,B3 are graphic blocks and blocks B1,B2 are natural blocks.

Respective block memory arrays are created.

For each block, a bit plane cruller (or 'block complete' variable) is initialized. Natural blocks have separate bit plane counters for dc data and ac data.

In a step 42, the receiver identifies on the basis of the data type flags and knowledge of the encoding triodes, to which blocks the refinement data parts in a current scan apply. For example, the first scan in the bitstream of Table I is flagged to have dc data and ac data. As these data types apply to natural blocks, the receiver knows that the first scan will contain dc and ac data for blocks B1 and B2.

In step 43, a data part is taken from the bitstream. The data is stored in the current bit plane of the eligible block and the associated bit plane counter is subsequently incremented. This procedure is repeated (steps 44, 45) for all blocks that are addressed in the current scan. In the present example, the first (post significant) coefficient bit plane of DCT blocks B1 and B2 is thus reconstructed in the first scan.

In a step 46, the end_of_stream flag that concludes each scan (cf. Table I) is checked. As long as its value is '0', another scan will follow and will be processed (step 47). The end_of_stream flag value '1' signifies the end of the video bitstream for the current slice. All blocks of the slice can then be decoded and displayed (step 48).

The invention is also illustrated in the form of the following syntax description. The syntax elements are indicated in bold and the number of bits in the right column. The relevant flags are one bit. Entities having a length X denote coded data representing the contents (bit plane(s)) identified by the flags preceeding it. It describes the syntax of the compressed video data stream for a slice in a formal manner and, at the same time, also describes the decoding process.

TABLE II

```
slice(nblocks,bitdepth,color_format){
    codec_version /* fixed to 0001 */        4
    nat_mode_used                            1
    graph_mode_used                          1
    skip_mode_used                           1
    block_order_per_bit_scan                 1
    if (block_order_per_bit_scan==0) {
        spatial_scan_order                   1
        comp_scan_order                      1
    }
    scan_order( )
    block_modes( )                           x
    if (nat_mode_used ==1) {
        nat_mode_init( )
    }
    if (graph_mode_used == 1) {
        graph_mode_init( )
    }
    for (i=0; i<nblocks; i++) {
        block_completed_dct_dc[i]=0
        block_completed_dct_ac[i]=0
        block_completed_graph[i]=0
    }
    do {
        block_bit_scan( )                    x
        end_of_stream                        1
    } while (end_of_stream ! = 1)
    if (nat_mode_used == 1) {
        nat_mode_post( )
    }
    if (graph_mode_used == 1) {
        graph_mode_post( )
    }
    if (skip_mode_used == 1) {
        skip_mode_post( )
    }
}
```

TABLE III

```
block_bit_scan( ){
    if (nat_mode_used) {
        dct_dc_data                          1
        dct_ac_data                          1
    } else {
        dct_dc_data=0
        dct_ac_data=0
    }
    if (dct_ac_data==1) {
        arithcod                             1
    } else {
        arithcod=0
    }
    if (graph_mode_used) {
        graph_data                           1
    } else {
        graph_data=0
    }
    data_each_block                          1
    if (block_order_per_bit_scan==1) {
        spatial_scan_order                   1
        comp_scan_order                      1
        scan_order( )
    }
    if (arithcod==1) {
        arithcod_bytes                       9
        for (i=0; i<arithcod_bytes; i++) {
            arithcod_buf[i]                  8
        }
    }
    for (i=0; i<nblocks; i++) {
        if (block_mode[scan_block[i]]==0) { /* DCT block */
            if (((dct_dc_data==1) &&
                (block_completed_dct_dc[scan_block[i]]==0)) ||
```

TABLE III-continued

```
          ((dct_ac_data==1) &&
          (block_completed_dct_ac[scan_block[i]]==0))) {
            if (data_each_block==0) {
              data_this_block                                    1
            } else {
              data_this_block=1
            }
            if (data_this_block==1) {
              if ((dct_dc_data==1) &&
                (block_completed_dct_dc[scan_block[i]]==0)){
                scan_dct_dc_data( )                              x
              }
              if ((dct_ac_data==1) &&
                (block_completed_dct_ac[scan_block[i]]==0)){
                scan_dct_aac_data( )                             x
              }
            }
          }
        }
        if (block_mode[scan_block[i]]==1) { /* graphic block */
          if ((graph_data==1) &&
          (block_completed_graph[scan_block[i]]==0)){
            if (data_each_block==0) {
              data_this_block                                    1
            } else {
              data_this_block=1
            }
            if (data_this_block==1) {
              scan_graph_data( )                                 x
            }
          }
        }
      }
    }
  }
}
```

Table II defines the syntax at slice level. The table mentions, inter alia, the presence in the bitstream of the array block_modes( ) described above at connection with step 13 in FIG. 1. The iterative scans described above in connection with step 14 in FIG. 1 are denoted block_bit_scan( ).

Table III defines the syntax of block_bit_scan( ) in more details. The flags dct_dc_data, dct_ac_data, and graph_data in this table correspond to the flags described before in connection with step 14 in FIG. 1. The actual image data is denoted scan_dct_dc_data( ), scan_dct_ac_data( ), and scan_graph_data( ) table.

The above syntax, also defines a number of additional features of further embodiments of the invention, for example;

Flags nat_mode_used, graph_mode_used, and skip_mode_used in Table II denote which coding modes apply to the part of the data that follows. Using such flag at slice level improves the efficiency of sending flags at scan level. For example, transmitting the flag graph_data in each scan may be omitted if the graphics encoding mode has not been used in a slice at all.

A subroutine scan_order( ) in Table II defines the order in which the blocks of it slice are scanned, by assigning to spatial order index i a scan order index scan_block [i. This allows the encoder to scan the blocks in the center of an image first.

A block_order_per_bit_scan flag (Table II) denotes whether the order of blocks in the scan is the same for all the scans.

A flag data_each_block (Table III) denotes whether the relevant scan comprises data for each block.

A flag arithcod in Table III indicates per scan whether the more efficient arithmetic coding is used to compress the AC coefficient bit plane.

Figure 5:
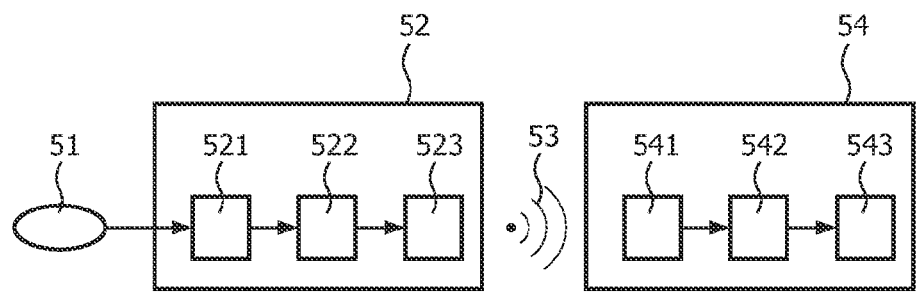
FIG. 5 shows a block diagram of an entertainment system comprising a encoder device and a decoder device in accordance with the invention.

FIG. 5 shows a block diagram of an entertainment system comprising a encoder device and a decoder device in accordance with the invention. The entertainment system comprises a Bluray disc player 52 and a flat TV monitor 54. The player 52 plays a Bluray disc 51 and sends the HD signal through a wireless HD channel 53 to the monitor. The player 52 comprises a playback module 521, a video encoder 522, and a wireless transmitting unit 523. The monitor comprises a wireless receiving unit 541, a video decoder 542, and a display 543. The video encoder 522 encodes each video image into a scalable bitstream in accordance with the encoding method described hereinbefore with reference to FIG. 1. The video decoder 542 decodes the received bitstream in accordance with the decoding method described hereinbefore with reference to FIG. 4.

In summary, a flexible and efficient bitstream format for a multi-mode scalable image/video codec is presented. Scalable means that the bitstream contains successively smaller quality refinements and that the bitstream can be truncated. The video images are divided in slices, and each slice is divided in blocks of 8×8 pixels. For each block, an optimal encoding method is chosen. Depending on whether the block is found to contain natural or synthetic image content, transform coding (DCT) or graphic coding is applied. Because the different encoding modes have different properties as regards picture quality, the bitstream format has to enable the encoder to very flexibly choose which bits to send first.

The bitstream format in accordance with the invention consists of a multitude of scans (31-34) through the coded data of a series of individual blocks, e.g. a slice. In each scan, the encoder decides whether it will include data for the natural blocks (BS1,BS2), for the synthetic blocks (BS0,BS1), or both. For the DCT blocks, it can further choose between DC coefficient bits (22) and AC coefficient bits (23). For example, the encoder can choose to first send a few scans of DCT DC bits, then send a few scans of graphics bits and then send some DCT AC bits. The decisions that the encoder makes are signaled to the decoder in the form of flags that precede each block part (e.g. encoded bit plane) and/or plurality of blocks (e.g. a slice).

The invention can typically be applied in the areas of image- and video compression, particularly for the next generation of Wireless HD.

The invention claimed is :

1. A method of encoding an image into a scalable bitstream, the method comprising acts of:
　dividing the image into image blocks;
　encoding each of the image blocks in accordance with one of a plurality of different encoding modes to obtain corresponding one or more bitstreams comprising one or more encoded image blocks and types of data representative of said encoding mode; and
　forming the scalable bitstream by iteratively scanning the one or more bitstreams by, for each scan
　　selecting at least one of said types of data,
　　including in the scalable bitstream the data of the selected types from the one or more bitstreams, and
　　including in the scalable bitstream one or more flags indicating the selected at least one type of data.

2. The method as claimed in claim 1, wherein one of said encoding modes is transform coding, the flags further indicating whether the included data comprises at least one of one or more bits of a DC coefficient and one or more bits of one or more AC coefficients.

3. The method as claimed in claim 2, wherein the AC coefficients are divided into bit planes, each bit plane is compressed, and the amount of data included in the scalable bitstream corresponds to a compressed bit plane.

4. The method as claimed in claim 2, further comprising an act of including, in each scan, an indicator indicating whether arithmetic coding is applied to said coefficients.

5. The method as claimed in claim 1, wherein one of said encoding modes is a graphics coding mode.

6. The method as claimed in claim 1, wherein one of said encoding modes is a skip mode in which an image block is represented by an indication that it is identical to a previous image block.

7. The method as claimed in claim 1, wherein the act of forming comprises an act of including an indication of an order of image blocks scanned.

8. The method as claimed in claim 1, wherein the act of forming comprises an act of including a flag to indicate whether the scan includes data for each image block.

9. The method as claimed in claim 8, wherein the act of forming comprises an act of induding, for each image block in each scan, a flag to indicate whether the scan includes data for said image block.

10. The method as claimed in claim 1, further comprising acts of:
　dividing each image into image slices;
　forming the scalable bitstream by successively scanning said image slices; and
　including in the scalable bitstream for each image slice, flags to indicate the encoding modes applied to the image blocks of said slice.

11. A device for encoding an image into a scalable scalable bitstream, the device comprising an encoder configured to:
　divide the image into image blocks;
　encode each of the image blocks in accordance with one of a plurality of different encoding modes to obtain corresponding one or more bitstreams comprising one or more encoded image blocks and types of data representative of said encoding mode; and
　form the scalable bitstream by iteratively scanning the one or more bitstreams to for each scan:
　　select at least one of said types of data,
　　include in the scalable bitstream the data of the selected types from the one or more bitstreams, and
　　include in the scalable bitstream one or more flags indicating the selected at least one type of data.

12. The device as claimed in claim 11, wherein one of said encoding modes is transform coding, the flags further indicating whether the included data comprises at least one of one or ore bits of a DC coefficient and one or more bits of one or more AC coefficients.

13. The device as claimed in claim 12, wherein the AC coefficients are divided into bit planes, each bit plane is compressed, and the amount of data included in the scalable bitstream corresponds to a compressed bit plane.

14. The device as claimed in claim 12, wherein the encoder is further configured to include in the scalable bitstream an indicator to indicate whether arithmetic coding is applied to said coefficients.

15. The device as claimed in claim 11, wherein one of said encoding modes is a graphics coding mode.

16. The device as claimed in claim 11, wherein one of said encoding modes is a skip mode in which an image block is represented by an indication that it is identical to a previous image block.

17. The device as claimed in claim 11, wherein the encoder is further configured to include in the scalable bitstream an indication of an order of image blocks scanned.

18. The device as claimed in claim 11, wherein the encoder is further configured to include a flag to indicate whether the scan includes data for each image block.

19. The device as claimed in claim 18, wherein the encoder is further configured to include, for each block in each scan, a flag to indicate whether the scan includes data for said image block.

20. The device as claimed in claim 11, wherein the encoder is further configured to
　divide each image into image slices,
　form the scalable bitstream by successively scanning said image slices, and
　include in the scalable bitstream for each image slice, flags to indicate the encoding modes applied to the image blocks of said slice.

21. A non-transitory memory medium comprising a computer program recorded thereon, which when executed on a computing device performs a method of encoding an image a scalable bitstream, the method comprising acts of:
　dividing the image into image blocks; and
　encoding each of the image blocks in accordance with one of a plurality of different encoding modes to obtain corresponding one or more bitstreams comprising one or more encoded image blocks and types of data representative of said encoding mode, each scan of the one or more bitstreams including one or more flags indicating at least one type of data in said scan.

* * * * *